C. LAGERGREN.
STEERING MECHANISM FOR AUTOMOBILES.
APPLICATION FILED MAY 17, 1913.
1,143,410.
Patented June 15, 1915.
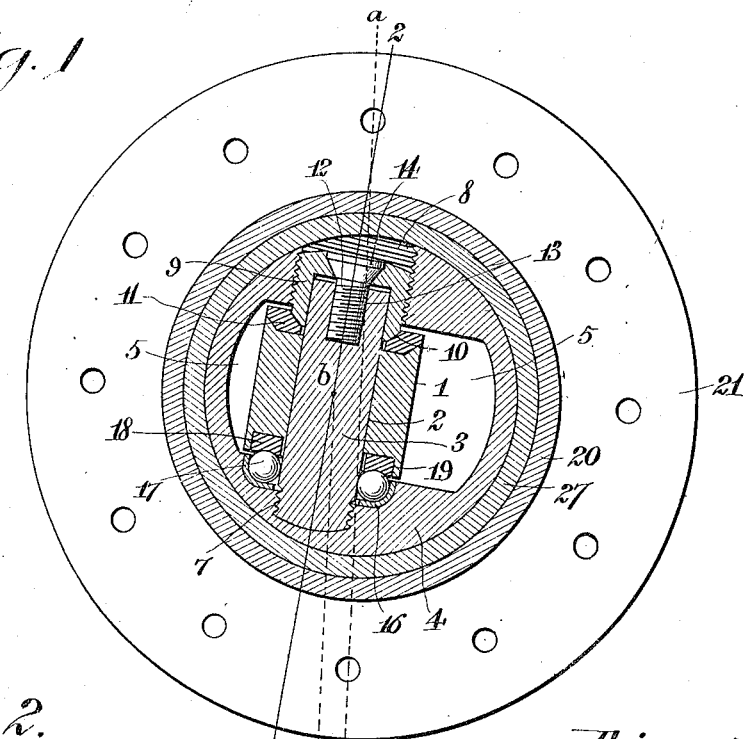
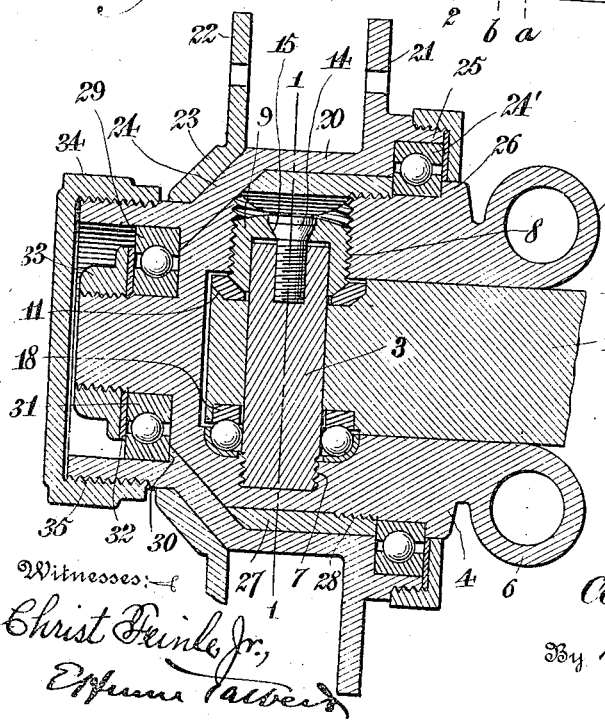
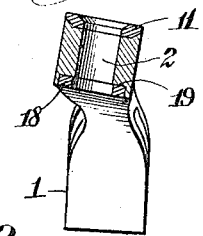
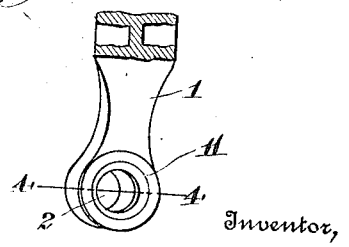
Inventor,
Carl Lagergren.
By Victor J. Evans,
Attorney.

UNITED STATES PATENT OFFICE.

CARL LAGERGREN, OF OSTERVILLE, MASSACHUSETTS.

STEERING MECHANISM FOR AUTOMOBILES.

1,143,410.

Specification of Letters Patent. Patented June 15, 1915.

Application filed May 17, 1913. Serial No. 768,331.

*To all whom it may concern:*

Be it known that I, CARL LAGERGREN, a citizen of the United States, residing at Osterville, in the county of Barnstable and State of Massachusetts, have invented new and useful Improvements in Steering Mechanism for Automobiles, of which the following is a specification.

This invention relates to steering mechanism for automobiles and vehicles in general, the main object of the invention being to so mount the steering wheels with relation to the axle that the axis of the joint between each steering wheel and the axle will be located in advance of a vertical line passing through the center of the wheel.

A further object of the invention is to so mount each steering wheel on the axle as to locate the axis of steering movement of said wheel in advance of a vertical line passing through the center of the wheel and also at an inclination with respect to said vertical line, whereby the steering wheel always has a tendency to straighten itself into longitudinal alinement with the machine, or in other words to line up with a straight ahead course after being deflected to one side or the other. This greatly relieves the operator at the steering wheel and materially increases the safety of the steering apparatus as a whole and is particularly valuable in case of any derangement of any of the steering connections, as the wheels will individually and independently resume a straightaway course and path even though the equalizing or connecting rod should break or become detached from the steering arm of either of the steering wheels.

With the above and other objects in view, the invention consists in the construction, combination and arrangement of parts, as will hereinafter be more fully described, illustrated and claimed.

In the accompanying drawings:—Figure 1 is a vertical section through the hub of a steering wheel and axle taken on the line 1—1 of Fig. 2. Fig. 2 is an inclined section taken on the line 2—2 of Fig. 1. Fig. 3 is a detail plan view of one end of the axle illustrating the inclination of the opening for the inclined pivot or journal of the steering wheel. Fig. 4 is a vertical section on the line 4—4 of Fig. 3.

The axle which carries the steering wheels of an automobile or similar vehicle is indicated at 1 and by reference to Figs. 1, 3 and 4 it will be noted that the extremity of the axle is formed with an opening 2 to receive the pivot pin or journal 3 which adapts the steering wheel to be turned laterally in the act of steering the machine. Furthermore it will be noted in said figures that the opening 3 is inclined with respect to a vertical line and this inclination of the opening 3 may be obtained either by giving a partial twist to the extremity of the axle as indicated in Figs. 3 and 4 or by primarily forming or shaping up the axle as illustrated.

4 designates the wheel bearing or as it is sometimes termed the steering knuckle, said bearing being internally recessed as shown at 5 to admit of the turning of said bearing on the axle for steering purposes. The bearing 4 is further provided with the arms or extensions 5′ and 6 to enable the customary steering and equalizing connections to be attached thereto.

The pivot 3 is of a length greater than the diameter of the extremity of the axle 1 and projects at both ends beyond the ends of the opening 2, the lower end of said pivot being threaded as shown at 7 into a socket in the lower portion of the wheel bearing 4. The upper portion of said bearing is provided with an internally threaded socket or opening 8 into which is screwed a cup shaped plug 9 as illustrated in Figs. 1 and 2, said plug being provided at its inner end with a cone face 10 which bears against the corresponding face of a cone bearing 11 set into the upper face of the axle 1, said plug 9 being held in its adjusted position by means of a locking screw 12 which is threaded into a socket 13 in the upper extremity of the pivot 3, said screw 12 being provided with a tapered head 14 and the plug 9 being formed with a correspondingly tapered internal face 15 against which the head 14 bears.

The lower portion of the wheel bearing 4 is provided with an annular recess around the pivot 3 to receive a bearing cup 16 in which is arranged an annular series of antifriction balls 17 which sustain the load imposed by the axle on the wheel, 18 designating a ball-race which is let into a recess 19 in the bottom of the axle 1 and which rests directly upon the balls 17. By turning the plug 9 inwardly, wear may be taken up between the axle and the wheel bearing and when the desired adjustment has been obtained, the position of the threaded plug 9 may be fixed by means of the locking screw 12.

20 designates the hub of the wheel provided with a fixed spoke flange 21 and a detachable spoke flange 22 having an inclined annular extension 23 which bears against a correspondingly inclined portion 24 of the hub 20. An anti-friction bearing 24' is interposed between a shoulder 25 of the hub and another shoulder 26 on the bearing 4, said bearing 24' also abutting against and being held in place by a sleeve 27 which is threaded upon the wheel bearing 4 at 28. Another anti-friction bearing 29 at the opposite side of the pivot 3 is set up against a shoulder 30 within the hub and a shoulder 31 on the wheel bearing 4 and is held in place by a washer 32 and a nut 33.

34 designates a cap which is threaded upon the end of the hub as shown at 35.

From the foregoing description taken in connection with the accompanying drawings it will be seen that the axis of the pivotal joint between the steering wheel and its axle is not only inclined with respect to a line passing vertically through the center of the wheel but the said inclined axis is also located in advance of a line passing through the vertical center of the wheel, the line of said axis of steering movement of the wheel being represented at 2—2 in Fig. 1, while the vertical line passing through the center of the wheel is indicated at a—a. The weight imposed on the wheel by the axle is transmitted through the vertical line b—b of Fig. 1 and it will be noted that the line of protraction of the axis of the joint between the wheel and its axle is located in advance of the joint where the wheel supports the load. Therefore, there is a constant tendency for the wheel to assume a straight-away position and each of the steering wheels has this inherent tendency. Therefore, should the equalizing or connecting rod between the steering wheel bearings become broken or disconnected, there is no danger of the wheels turning in one direction or the other as they will individually and independently seek to follow a straight-away course. Furthermore, when the wheels are turned to steer the machine to one side or the other, said wheels will bank or lean toward the inner side of the curve being described by the machine. This greatly relieves the strain on the hubs of the wheels and the tendency to push the hubs out of the wheels, as the thrust produced by a sharp turn of the machine is transmitted more nearly in the direction of length of the spokes which direction of thrust the spokes are better adapted to withstand. As soon as the turn has been effected, the operator is merely required to relax the tension of his hold upon the hand wheel, whereupon the steering wheels will automatically restore themselves to their normal straight-away positions and continue in such position until they are again deflected or turned to one side or the other by the operator. The action referred to is produced by reason of the location of the axis of steering movement of the wheels in advance of the vertical centers of the wheels and also by reason of the inclination of the axis of steering movement of the wheels. Furthermore, it will be noted by reference to Fig. 2 that the pivot 3 is located in the transverse center of the wheel or in other words in vertical alinement with the point of contact between the wheel and the surface upon which it is traveling, thereby adding to the ease with which the steering wheel may be turned by the operator.

What is claimed is:—

In steering mechanism of the class specified, an axle formed with a pivot pin hole extending transversely therethrough at an angle to a vertical line, a steering wheel, a bearing for said wheel having threaded sockets of different diameters above and beneath the axle and in line with said pivot pin hole, the longitudinal axes of said hole and sockets being in a line located in advance of and at an inclination to a vertical line passing through the center of the wheel, a pivot pin passing through said hole in the axle and having its lower end threaded into the lower socket of said bearing, a cup shaped plug screwed into the upper socket of said bearing and embracing the upper extremity of said pivot pin, and a locking screw inserted through the upper wall of said plug into said pivot pin.

In testimony whereof I affix my signature in presence of two witnesses.

CARL LAGERGREN.

Witnesses:
E. Edmonston, Jr.,
E. Hume Dean.